United States Patent
Liao et al.

(10) Patent No.: US 7,125,537 B2
(45) Date of Patent: Oct. 24, 2006

(54) METHOD FOR MANUFACTURING NANOPOWDERS OF OXIDE THROUGH DC PLASMA THERMAL REACTION

(75) Inventors: Shih-Chieh Liao, Chungli (TW); Song-Wein Hong, Erlin Township (TW); Hsiu-Fen Lin, Taichung (TW)

(73) Assignee: Industrial Technology Research Institute(TW)

( * ) Notice: Subject to any disclaimer, the term of this patent is extended or adjusted under 35 U.S.C. 154(b) by 0 days.

(21) Appl. No.: 11/024,404

(22) Filed: Dec. 30, 2004

(65) Prior Publication Data

US 2005/0186132 A1    Aug. 25, 2005

(30) Foreign Application Priority Data

Feb. 20, 2004    (TW) .............. 93104176 A

(51) Int. Cl.
*C01B 13/20* (2006.01)

(52) U.S. Cl. .............. 423/592.1; 264/10; 423/579; 977/DIG. 1

(58) Field of Classification Search ............ None
See application file for complete search history.

(56) References Cited

U.S. PATENT DOCUMENTS

| | | | |
|---|---|---|---|
| 5,460,701 A | 10/1995 | Parker et al. | |
| 5,665,277 A * | 9/1997 | Johnson et al. | 264/6 |
| 5,788,738 A * | 8/1998 | Pirzada et al. | 75/331 |
| 5,876,688 A | 3/1999 | Laundon | |
| 5,958,361 A | 9/1999 | Laine et al. | |
| 6,099,696 A | 8/2000 | Schwob et al. | |
| 2003/0143153 A1* | 7/2003 | Boulos et al. | 423/592.1 |
| 2005/0119398 A1* | 6/2005 | Zhang | 524/497 |

FOREIGN PATENT DOCUMENTS

WO    9705995    2/1997

* cited by examiner

*Primary Examiner*—Mary Lynn Theisen
(74) *Attorney, Agent, or Firm*—Lowe Hauptman & Berner LLP

(57) ABSTRACT

A method for manufacturing powders of oxides in a nanometer level through a direct current plasma thermal reaction is disclosed. The energy required is provided by the plasma that is generated in the non-transferred DC plasma apparatus. Once the solid precursors are introduced into the plasma, the solid precursors are vaporized and oxidized in the plasma reaction region of the non-transferred DC plasma apparatus continuously. Then, the oxide powders in a nanometer scale can form homogeneously and continuously. By controlling the nozzle size, the speed of the plasma can be adjusted and the coarsening and agglomeration of the nanopowders can be effectively prevented. Finally, oxide nanopowders of high-purity and high-dispersity are obtained by cooling down the plasma gas containing the vaporized and oxidized precursor through a vortical cooling-gas.

13 Claims, 3 Drawing Sheets

METHOD FOR MANUFACTURING NANOPOWDERS OF OXIDE THROUGH DC PLASMA THERMAL REACTION

BACKGROUND OF THE INVENTION

1. Field of the Invention

The present invention relates to a method for manufacturing nanopowders and, more particularly, to a method for manufacturing oxide powders in a nanometer scale through direct current plasma thermal reactions.

2. Description of Related Art

It is known that nanopowders are referred to as ultra-fine solid particles of size less than 100 nanometers. Generally speaking, the structure of nanopowders mainly includes two parts. The first part comprises particles with a diameter ranging from several nanometers to less than a hundred nanometers. The other part comprises the surfaces of the particles illustrated above or the interfaces between these particles. Basically, the former part has an either short- or long- range ordered structure. In contrast, the second part has a random structure without a long- or short-ranged order. Owing to the high surface area and special structure illustrated above, nanopowders often show different magnetic properties, dielectric properties, superconductivity, optical properties, and thermodynamic properties.

Conventionally, nanoparticles can be prepared through a top-down method such as high-energy mechanical milling, or a bottom-up method such as gas phase condensation, liquid phase chemical precipitation, and sol-gel. In general, the cost for preparing nanoparticles through liquid phase is low. However, serious agglomeration and low purity are the major problems.

Recent research reports disclose gas-phase condensation methods for preparing nanopowders. For example, a method for preparing metal oxide nanopowders is disclosed in U.S. Pat. No. 5,460,701. The nanopowders are prepared by introducing an electrical current to a cathode and an anode of a metal rod first. Then a plasma arc is generated in the gap between the anode and the cathode. The metal rod is vaporized soon and the vapor is condensed into powders of metal oxides through the assistance of inert gas flow and/or oxygen flow. However, metal rods have to be supplied in time before the electrode is consumed in this method for preparing nanopowders continuously.

Another method for preparing nanopowders can be seen in WO 9705994, wherein the nanopowders are prepared by heating a precursor of a target metal close to supercritical temperature for vaporization. Then the vaporized precursors are sprayed out to form a reaction mixture vapor. Subsequently, nanopowders are formed by passing the reaction mixture vapor through plasma. However, only precursors in solution form can be applied. In addition, the precursors require heating to a high temperature close to the supercritical temperature in this method.

More methods for preparing nanopowders are described in several patent documents. For example, in U.S. Pat. No. 5,876,688, zinc oxide nanopowders with a diameter less than 80 nm are prepared by injecting nebulized organic salts of zinc to a flame or plasma ranging from 250° C. to 2000° C. In U.S. Pat. No. 5,958,361, a nebulized ceramic precursor solution containing a volatile organic solvent and at least one glycolato polymetallooxanei is pyrolyzed in a flame to produce oxide nanopowders. In U.S. Pat. No. 6,099,696, nanocarbon materials are made by carrying carbon materials or carbon hydrogen compounds into plasma generated between a set of non-transferred electrodes through hydrogen gas.

Since pretreatment of the compounds of a target metal or supplying/replacing an electrode is required for preparing nanopowders, the recent methods illustrated above are not convenient enough for mass-producing nanopowders. Hence, a method for producing nanopowders with less pretreatment to mitigate and/or obviate the aforementioned problems is needed.

SUMMARY OF THE INVENTION

The object of the present invention is to provide a method for mass-producing oxide nanopowders continuously.

In the method for manufacturing oxide nanopowders of the present invention, plasma is generated by providing enough electric energy to the non-transferred DC plasma apparatus. Subsequently, the solid precursors are vaporized and oxidized by delivering them to the plasma reaction region continuously. Then, the oxide powders in nanometer scale can form continuously. Through the method illustrated above, the disadvantages seen in the conventional art such as pretreatment of precursors and supplying/replacing electrodes in time can be avoided.

Another object of the present invention is to provide a method for mass-producing oxide nanopowders of high-purity and high-dispersity.

In the method for manufacturing nanopowders of the present invention, the speed of the plasma can be adjusted through controlling the nozzle size, the power of plasma, and the species and flow rate of the plasma-forming gas. The processing parameters are adjusted to complete the overall reaction (i.e. vaporization, oxidation, and quenching processes) within a time period of $10^{-2}$ to $10^{-1}$ second. In such a reaction condition, the coarsening and agglomeration of the nanopowders can be effectively prevented. Hence, the oxide nanopowders of high purity and high dispersity can be obtained. Furthermore, the chemical compositions, phase purity, structure, and size of the obtained nanopowders can be controlled through the method of the present invention.

The solid precursor applied in the method of the present invention can be metal powders in micrometer scale, oxide powders in micrometer scale, or metal (alloy) wires with a millimeter-scaled diameter. The cost for producing highly pure single and multi-component oxide nanopowders is low. Moreover, the supersonic plasmajet is very helpful to the dispersion of clusters of nanoparticles in a high-temperature atmosphere.

In addition, since several parameters such as the plasma power, species and flow rate of the plasma-forming gas, species and feeding rate of the solid precursor, species and flow rate of the carrier gas, and flow rate of the plasma can be well-controlled, and thus the chemical composition, phase purity, structure, size, and shape of the nanopowders can be adjusted easily.

The method for manufacturing oxide nanopowders of the present invention includes the following steps. First, a non-transferred DC plasma apparatus equipped with one to three (three preferably) sets of non-transferred electrodes (a cathode and an anode), a plasma-convergence section and a nozzle for spraying out plasma is provided. Plasma in the plasma-convergence section is generated by introducing a direct current to the non-transferred electrodes in the presence of the plasma-forming gas. Subsequently, a plasma jet is formed and a solid precursor of the metal in the form of powders or wire is introduced to the plasma in the plasma-convergence section continuously, wherein the solid precursor is vaporized (and oxidized if carrier gas contains oxygen) before being sprayed out with the plasma jet. Finally, nanopowders are obtained by cooling down the plasma gas containing the vaporized and oxidized precursor through a vortical cooling-gas.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
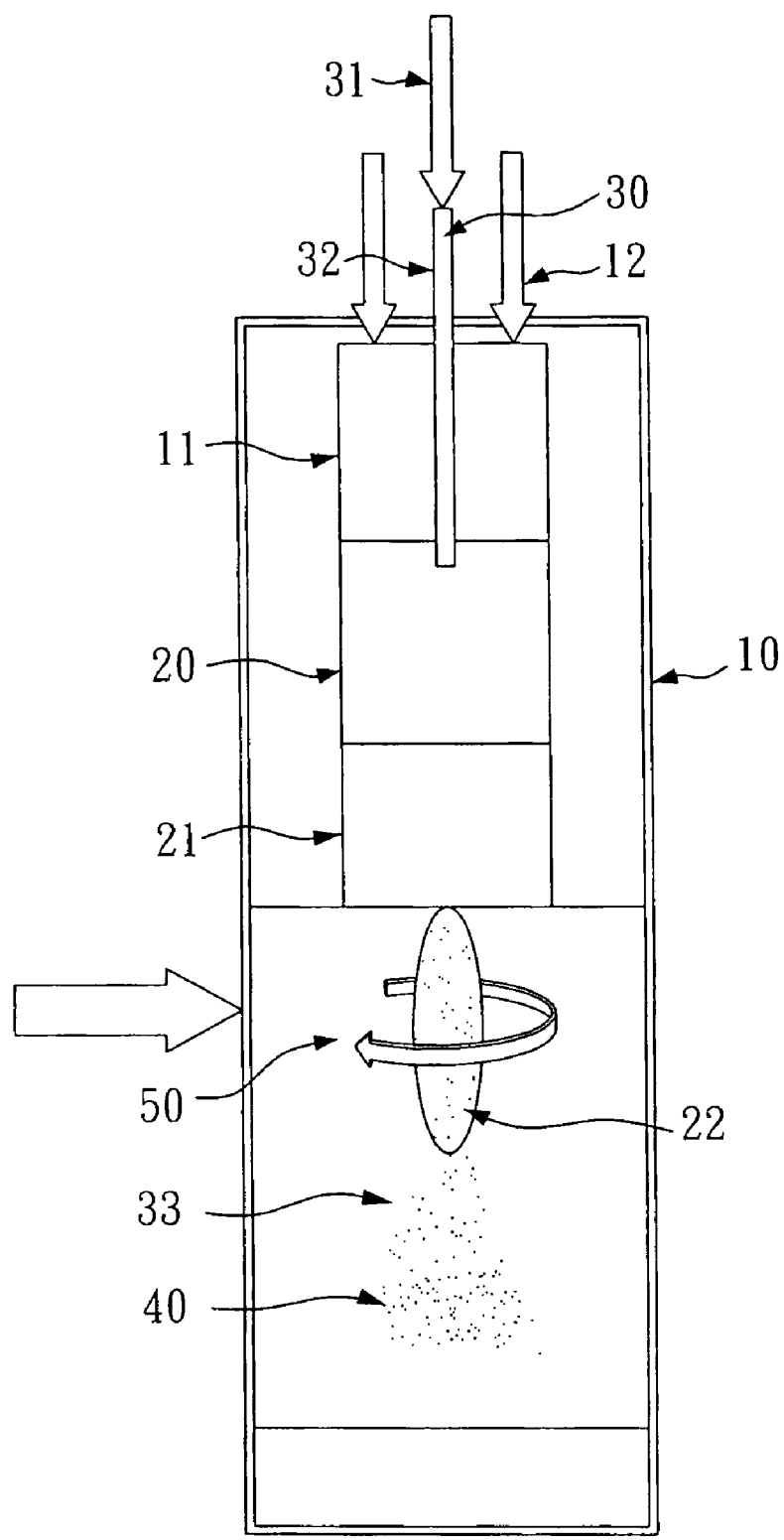
FIG. 1 is a block diagram for showing the apparatus for achieving the method of the embodiment of the present invention.

Here following is an embodiment of the method for manufacturing nanopowders of the present invention. First, a non-transferred DC plasma apparatus is provided for the manufacturing of nanopowders. FIG. 1 shows a non-transferred DC plasma apparatus 10 used in the present embodiment of the present invention. The non-transferred DC plasma apparatus 10 is equipped with one to three (three preferably) sets of non-transferred electrodes (a cathode and an anode) 11, a plasma-convergence sector 20, and a nozzle 21. The non-transferred electrodes 11 are used for generating an arc by introducing a direct current between the electrodes. After the arc is generated, the preset plasma-forming gas 12 is introduced to pass through the arc to form the required plasma for the reactions.

The generated plasma in the plasma-convergence sector 20 is further introduced to pass through a nozzle 21 to form a high-speed plasma jet 22. The speed of the plasma jet 22 can be further controlled by adjusting the outlet diameter of the nozzle, the power of the plasma, and the species and flow rate of the plasma-forming gas 12.

After the formation of the plasma, a solid precursor 30 is introduced to the plasma-convergence sector 20 for vaporization (and oxidation if carrier gas contains oxygen) and is sprayed out with the plasma jet 22.

The spraying out plasma jet 22 with vaporized and oxidized solid precursor is rapidly cooled down by blowing a large amount of vortical cooling-gas (i.e. air) 50 over it to form oxide nanopowders 40.

Figure 2:
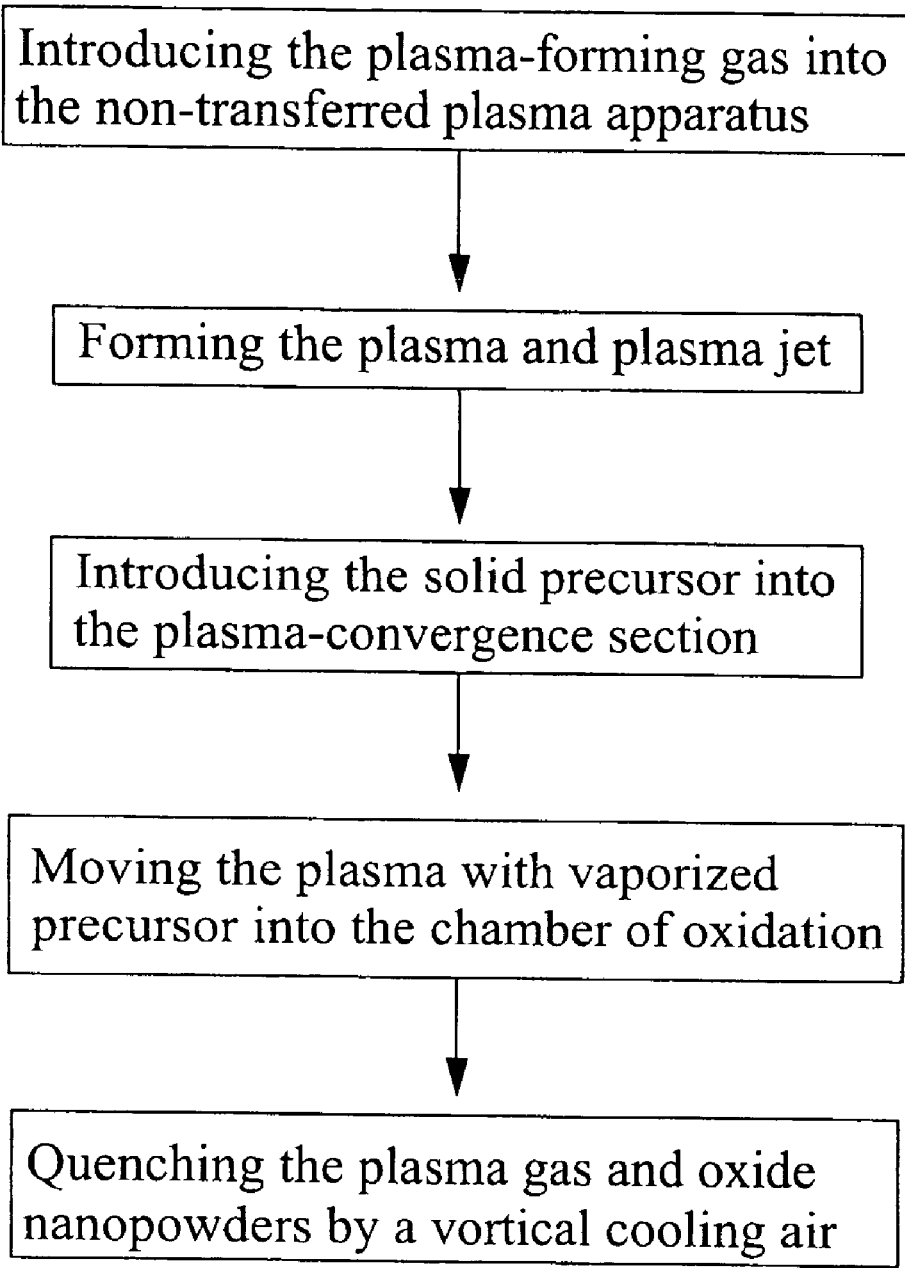
FIG. 2 is a flow chart of the method of the embodiment of the present invention.

The solid precursor used in the method of the present invention can be any conventional solid precursor. Preferably, the solid precursor is a metal wire with a millimeter-scaled diameter, micrometer-scaled metal powders, micrometer-scaled metal carbonate powders, micrometer-scaled metal nitrate powders, micrometer-scaled metal oxalate powders, micrometer-scaled metal ammonium powders, or micrometer-scaled metal oxide powders. In the present embodiment, the solid precursor illustrated above is introduced to the plasma-convergence sector 20 through a pipe 32 by the assistance of a carrier gas 31. The carrier gas can be any conventional carrier gas. The carrier gas 31 can be air, argon, nitrogen, oxygen, or any other gas necessary for the reaction. Moreover, the characteristics of the produced oxide nanopowders 40 in the embodiment can be affected or adjusted by controlling the flow rate of the carrier gas 31. Detailed method of the present embodiment of the present invention can be also seen in FIG. 2.

The plasma-forming gas 12 introduced to the plasma apparatus 10 generally can be inert gas (e.g. argon, or helium) or other conventional gases (e.g. hydrogen, or nitrogen). In most cases, the plasma-forming gas 12 includes 0 to 100% of argon, 0 to 100% of nitrogen, and 0 to 25% of hydrogen. In other words, the plasma-forming gas can be argon, nitrogen, hydrogen or any combination thereof. In the present embodiment, the flow rate of the plasma gas ranges from 100 to 250 L/min and the power of the plasma ranges from 50 to 140 KW.

In the present embodiment, the non-transferred electrodes 11 are supplied with a direct current ranging from 170 to 250 Ampere (with 440 Volt) to generate an arc. As the plasma-forming gas 12 passes through the arc, the plasma-forming gas 12 will be transformed into plasma in the plasma-convergence sector 20 since it is ionized by the high energy provided by the non-transferred electrodes 11. At the same time, the volume of the transformed plasma swells out rapidly and forms a plasma jet 22 by passing through the nozzle 21. The plasma jet 22 can be tuned by controlling the outlet diameter of the nozzle 21. The speed of the plasma jet 22 can be further adjusted by controlling the power of the plasma, and the species and flow rate of the plasma-forming gas 12.

The solid precursor 30 such as micrometer-scaled metal powders, micrometer-scaled metal chloride powders, micrometer-scaled metal carbonate powders, micrometer-scaled metal nitrate powders, micrometer-scaled metal oxalate powders, micrometer-scaled metal ammonium powders, or micrometer-scaled metal oxide powders is vaporized (and oxidized if the carrier gas contains oxygen) by introduction to the plasma-convergence section 20 by the assistance of the carrier gas 31. In the present embodiment, the flow rate of the carrier gas 31 ranges from 3 to 25 L/min and the feeding velocity of the solid precursor ranges from 0.5 to 2.0 Kg per hour.

The plasma jet 22 together with the vaporized (and oxidized if the carrier gas contains oxygen) solid precursor is then introduced to a chamber 33. In the chamber 33, the atmosphere contains oxygen and the pressure thereof is controlled around 1 bar in the present embodiment.

In the chamber 33, the metal molecules of the vaporized solid precursor are further oxidized by reacting with the oxygen molecules. Oxide nanopowders 40 are formed and cooled down rapidly by blowing a large amount of vortical cooling-gas 50 over them for preventing unwanted coarsening and aggregation. The cooling-gas is preferred to be air. Flow rate of the cooling-gas is controlled in a range of 1 to 5 $m^3$/min.

Figure 3:
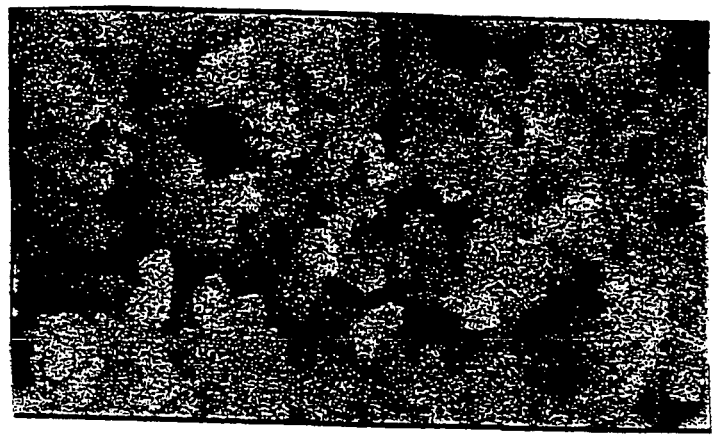
FIG. 3 is a field emission EM photograph of the ZnO nanopowders made through the method of the present invention.

FIG. 3 is a field emission EM photograph of the ZnO nanopowders made by the method of the present embodiment. The average diameter of the particles is 25 nm and the surface area measured through BET is 28 $m^2$/g.

Figure 4:
FIG. 4 is a field emission EM photograph of the $SnO_2$ nanopowders made through the method of the present invention.

FIG. 4 is a field emission EM photograph of the SnO$_2$ nanopowders made by the method of the present embodiment. The average diameter of the particles is 15 nm.

Figure 5:
FIG. 5 is a field emission EM photograph of the $Al_2O_3$ nanopowders made through the method of the present invention.

FIG. 5 is a field emission EM photograph of the Al$_2$O$_3$ nanopowders made by the method of the present embodiment. The average diameter of the particles is 40 nm and the surface area measured through BET is 41 m$^2$/g.

Although the present invention has been explained in relation to its preferred embodiment, it is to be understood that many other possible modifications and variations can be made without departing from the spirit and scope of the invention as hereinafter claimed.

What is claimed is:

1. A method for manufacturing oxide nanopowders, comprising the following steps:
   providing a non-transferred DC plasma apparatus equipped with one to three sets of non-transferred electrodes, a plasma-convergence section and a nozzle for spraying out plasma;
   generating a plasma in the plasma-convergence section by introducing a direct current to the non-transferred electrodes in the presence of the plasma-forming gas;
   introducing a solid precursor to the plasma-convergence section continuously, wherein the solid precursor is vaporized and oxidized before being sprayed out with the plasma jet; and
   obtaining nanopowders by blowing the plasma jet containing the vaporized and oxidized precursor through a vortical cooling-gas.

2. The method as claimed in claim 1, wherein the plasma-forming gas is selected from a group consisting of argon, helium, hydrogen and nitrogen.

3. The method as claimed in claim 1, wherein the plasma-forming gas is argon, helium, nitrogen, or a combination thereof.

4. The method as claimed in claim 1, wherein the feeding rate of the solid precursor ranges from 0.5 to 2.0 Kg/hour.

5. The method as claimed in claim 1, wherein the solid precursor is a metal wire.

6. The method as claimed in claim 1, wherein the solid precursor is selected from a group consisting of microscaled metal powders, metal carbonate powders, metal nitrate powders, metal oxalate powders, metal ammonium powders, and metal oxide powders.

7. The method as claimed in claim 6, wherein the solid precursor is introduced to the plasma jet in the plasma-convergence section continuously through a carrier gas.

8. The method as claimed in claim 7, wherein the carrier gas is selected from a group consisting of air, argon, nitrogen and oxygen.

9. The method as claimed in claim 7, wherein the carrier gas is air, argon, nitrogen, oxygen, or a combination thereof.

10. The method as claimed in claim 7, wherein the flow rate of the carrier gas ranges from 3 to 25 L/min.

11. The method as claimed in claim 1, wherein the cooling-gas is air.

12. The method as claimed in claim 1, wherein the cooling-gas is a combination of air and nitrogen.

13. The method as claimed in claim 1, wherein flow rate of the cooling-gas ranges from 1 to 5 m$^3$/min.

* * * * *